United States Patent [19]

Rastas et al.

[11] 3,959,437

[45] May 25, 1976

[54] HYDROMETALLURGICAL PROCESS FOR THE RECOVERY OF ZINC, COPPER AND CADMIUM FROM THEIR FERRITES

[75] Inventors: Jussi Kalevi Rastas, Pori; Tor-Leif Johannes Huggare; Sigmund Peder Fugleberg, both of, Kokkola, all of Finland

[73] Assignee: Outokumpo Oy, Helsinki, Finland

[22] Filed: Feb. 1, 1974

[21] Appl. No.: 438,653

[30] Foreign Application Priority Data
Feb. 12, 1973 Finland .................................. 410/73

[52] U.S. Cl. .................................. 423/36; 423/41; 423/109; 423/145; 423/146; 423/150
[51] Int. Cl.² .................. C01G 3/10; C01G 9/00; C01G 11/00; C01G 49/14
[58] Field of Search .............. 423/41, 109, 145, 150, 423/143, 144, 36; 75/120, 108

[56] References Cited
UNITED STATES PATENTS

| | | | |
|---|---|---|---|
| 1,834,960 | 12/1931 | Mitchell | 75/115 X |
| 3,434,947 | 3/1969 | Steintveit | 75/120 X |
| 3,493,365 | 2/1970 | Pickering et al. | 75/120 X |
| 3,793,429 | 2/1974 | Queneau et al. | 423/145 X |
| 3,798,304 | 3/1974 | Weston | 423/143 X |

*Primary Examiner*—Oscar R. Vertiz
*Assistant Examiner*—Brian E. Hearn
*Attorney, Agent, or Firm*—Brooks, Haidt, Haffuer & Delahunty

[57] ABSTRACT

A hydrometallurgical method of recovering zinc, copper and cadmium from their ferrites so that the ferrites are treated under atmospheric conditions in sulphuric acid bearing solution in the presence of potassium-, sodium- or ammonium-ions, is disclosed, in which the treatment takes place in one stage under such conditions that the non-ferrous metals, zinc, copper and cadmium, contained in the ferrites are transferred as sulphates to the solution and the iron is converted in the same stage to a solid basic iron salt by adjusting the sulphuric acid or ferric sulphate addition to be equivalent with regard to the ferrite amount fed into this stage and by adjusting the temperature to 80° – 105°C, preferably to 95° – 105°C, and further by adjusting the sulphuric acid content so that the total reaction takes place sufficiently quickly and after that the solid material is separated from the solution by washing it well with water and the solution and the wash water are returned to the neutral leaching stage.

11 Claims, 4 Drawing Figures

HYDROMETALLURGICAL PROCESS FOR THE RECOVERY OF ZINC, COPPER AND CADMIUM FROM THEIR FERRITES

BACKGROUND OF THE INVENTION

This invention relates to a hydrometallurgical method of recovering zinc, copper and cadmium from the oxidic compounds of these metals and iron. The invention is particularly suitable for being used in connection with hydrometallurgical production of zinc.

The electrolytic zinc process uses as its principal starting material the oxidic product obtained from sulphidic zinc concentrate by roasting zinc calcine. It contains the zinc mostly as oxide (80 – 90 %), for a considerable part as ferrite (5 – 15 %), some as sulphate (2 – 5 %) and small amounts as unroasted sulphide, silicate and aluminate. The calcine, the zinc content of which is in general between 50 – 65 %, contains 3 – 12 % iron, about 1 % lead and silicon dioxide, some tenths per cent of copper, cadmium, manganese, magnesium, barium and aluminum. Calcine contains also minor amounts of silver (10 – 100 ppm) and gold (< 1 ppm).

The iron in the calcine is almost completely in ferrite form, the principal product being zinc ferrite $ZnFe_2O_4$. The ferrites have a decisive significance with regard to further treatment of calcine.

Almost up to the present time, selective leaching has been carried out with calcine in weak sulphuric acid solution so that the oxides dissolve while the ferrites stay mostly undissolved. The reason for that has been the difficulty in precipitating in an easily filterable form the big amounts of iron formed in leaching of ferrites. The leach residue formed as a result of such a leaching treatment consists thus mainly of ferrites containing also insoluble sulphates and other insoluble compounds such as silicates.

For further processing of this ferritic leach residue and for recovering the valuable materials contained in it, e.g. a hydrometallurgical method known by the name of jarosite process has been developed. It has been described in more detail in the Norwegian Letters Patent No. 108,047 and in the Article "Die Eisenfällung als Jarosit und ihre Anwendung in der Nassmetallurgie des Zinks" by G. Steintveit, Erzmetall 23 (1970) 532–539.

In the jarosite process, the ferritic leach residue is leached at a sufficiently high temperature (90° – 95°C) in the return electrolyte of zinc electrowinning (=spent electrolyte), whereby most of the ferrites dissolve. The solid material remaining in this leaching — which contains the ferrites still left undissolved, difficultly soluble sulphates ($PbSO_4$, $CaSO_4$, $BaSO_4$), most of the silicon (in the form of $SiO_2$) and silver and gold — can be separated from the solution and led to processes, where it is possible to carry out the separation and recovery of the valuable materials contained in it (Pb, Ag, Au). If the Pb-, Ag- and Au-contents are low, this separation is not necessary and the solution with its solid materials can be led — as generally done at present — directly to iron precipitation.

The solution formed in leaching of ferrites, the iron and sulphuric acid contents of which solution are most usually varying between 20 – 35 g/l and 40 – 80 g/l, respectively, has been led directly or after preneutralization to iron precipitation. Zinc calcine has been fed to this stage to neutralize the excess sulphuric acid and that liberated in precipitation reactions. In general, the pH-value has been endeavoured to be adjusted in the precipitation stage of the jarosite process to 1.2 – 1.4. When also sodium and ammonium salts have been fed to this stage, the iron is precipitated as sodium or ammonium jarosite ($A[Fe_3(SO_4)_2(OH)_6]$; $A = Na, NH_4$). Here the characteristic of the ferric iron to form difficultly soluble basic sulphates in acid solutions in the presence of $NH_4^+$-, $Na^+$- and $K^+$-ions under atmospheric conditions has been made use of (J. G. Fairchild, Amer. Min. 18 (1933) 543–547; G. P. Brophy, E. S. Scott, R. A. Snellgrove, Amer. Min. 47 (1962) 112–126; N. W. Sziszhin, Zap. Ws. Min. Obszcz. 79 (1950) 94–102; N. W. Sziszhin, E. A. Krogius, P. A. Lowowics, Zap. Ws. Min. Obszcz. 87 (1958) 682–686; Z. Harada, M. Goto, Kobutsugaku Zasshi 1 (1954) 344–355, Ref. Chem. Abstr. 51 (1957) 143 h).

The ferritic part of calcine used for neutralization does not dissolve in the precipitation stage, but remains in the iron precipitation. Therefore, acid wash of jarosite precipitate has been connected to the jarosite process (Norwegian Letters Patent No. 123,248). Sulphuric acid or spent electrolyte is sufficiently added to the thickened jarosite precipitate slurry, and the leaching conditions are maintained to correspond to those of the leaching stage of ferrites. Now most part of the ferrites in the precipitate dissolve while the jarosite remains undissolved.

Accordingly there can be four additional stages in the jarosite process in addition to neutral leaching: leaching of ferrites, neutralization of excess acid, precipitation of iron as jarosite and acid wash of the jarosite precipitate. Each one of these stages requires a separate adjustment and control system and a considerable number of reactors and thickeners (FIG. 1).

It is also possible to precipitate the iron in autoclave without neutralization either at a higher temperature (180° – 220°C) as a mixture of hematite and hydronium jarosite or in the presence of $NH_4^+$-, $NA^+$- and $K^+$-ions at a somewhat lower temperature (140° – 180°C) as ammonium-, sodium- and potassium-jarosite (U.S. Letters Pat. No. 3,493,365; Canadian Letters Patent No. 787,853).

In both of the methods described above, leaching of ferrites and precipitation of iron are carried out in different stages. In the method described first — in its most common form — this precipitation stage is combined with one preceding (preneutralization) and one subsequent stage (acid wash). In the latter method, precipitation of iron is carried out in autoclave, which both process and equipment technically is considerably more difficult to perform than atmospheric process stages.

SUMMARY OF THE INVENTION

According to the invention there is now provided a process in which the treatment takes place in one stage under such conditions that the non-ferrous metals, zinc, copper and cadmium, contained in the ferrites are transferred as sulphates to the solution and the iron is converted in the same stage to a solid basic iron salt by adjusting the sulphuric acid or ferric sulphate addition to be equivalent with regard to the ferrite amount fed into this stage and by adjusting the temperature to 80° – 105°C, preferably to 95° – 105°C, and further by adjusting the sulphuric acid content so that the total reaction takes place sufficiently quickly and after that the solid material is separated from the solution by washing it well with water and the solution and the wash water are returned to the neutral leaching stage.

Accordingly the invention enables achieving — also under atmospheric conditions — in one stage the same result as in all the stages together subsequent to the neutral leaching of the prior art methods described above (e.g. in the atmospheric process FIG. 1. stages (2 – 5), i.e. an iron precipitate almost free of ferrites is achieved.

The invention leads to a simple process, reliable in operation, and also considerable saving in equipment is achieved compared with previous methods.

DESCRIPTION OF THE PREFERRED EMBODIMENTS

Figure 1:
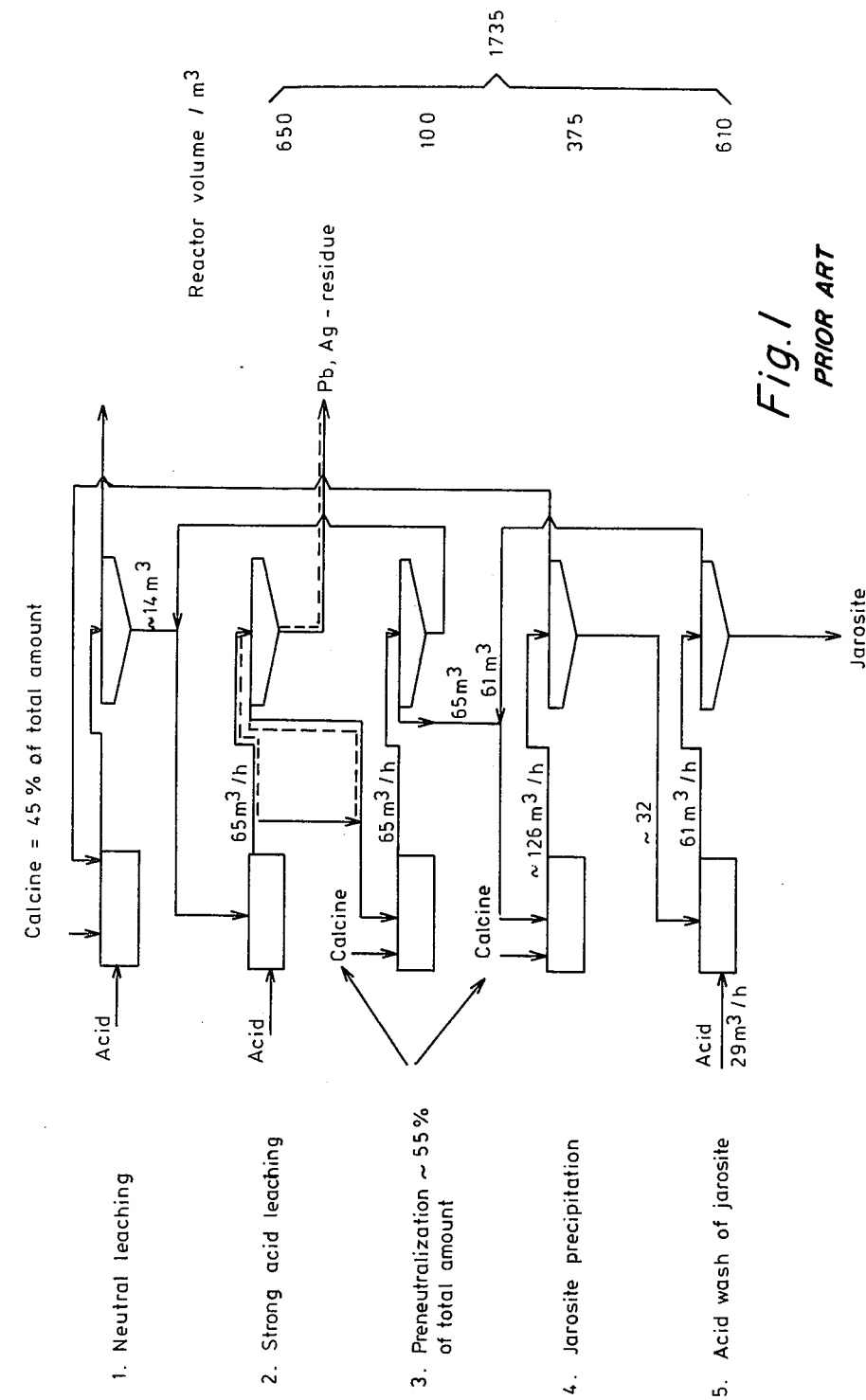
FIG. 1 presents the flowsheet of the known jarosite process.

Before starting to describe the various embodiments of the invention, it is justified to examine the factors having effect on the leaching rate of ferrites on one hand and on the precipitation velocity of jarosite and other basic iron salts on the other hand.

The leaching rate of ferrites follows the following dependence:

$$\frac{dx}{dt} = kS_o(1-x)^{2/3} \quad (1)$$

or in integrated form $$1-(1-x)^{1/3} = Kt \quad (2)$$

where $$K = \tfrac{1}{3}kS_o \quad (3)$$

The change of the specific area $S_x$ during leaching follows the formula $$S_x = \frac{S_o}{(1-x)^{1/3}} \quad (4)$$

There are in equation (1 – 4):
$x$ = progress degree of leaching
$S_o$ = initial specific area of ferrites (m²/g)
$S_x$ = specific dred with values x of the progress degree of leaching m²/g)
$t$ = leaching time (min)
$K$ = leaching rate constant dependent on specific area (min⁻¹)
$k$ = leaching rate constant independent of specific area (g . min⁻¹ . m⁻²).

The k-values of the reaction velocity constant are of the order of 3–6 . $10^{-3}$g . min⁻¹ . m⁻².

The leaching rate of zinc ferrites is primarily a function of specific area, temperature and sulphuric acid concentration. Changes in the specific area have a great effect on the leaching rate. On the other hand, alterations cannot be accomplished here generally by adjusting the roasting conditions; the specific area can be considered as a quantity typical of each calcine — based on the structure of the concentrate. The temperature has also a considerable effect on the reaction velocity. It is necessary to operate at leaching temperatures between 70°–100°C — preferably between 90°–100°C. As to the effect of the sulphuric acid concentration, it can be pointed out that the leaching rate is almost linearly dependent on the sulphuric acid concentration, at least between 10 –100 g/l. When the temperature is between 95°–100°C, the reaction velocity constant $k$ has also at $H_2SO_4$-concentrations of even below 30 g/l a sufficiently high value with regard to the method to be described here later on.

The precipitation velocity of iron is a function of $Fe^{3+}$-concentration, $H_2SO_4$-content, $NH_4^+$-, $Na^{2+}$-, $K^2$-ion concentrations and temperature.

Iron precipitation in system $Fe_2O_3$-$SO_3$-$H_2O$, free of ammonium and alkali, has been discussed e.g. in the Article "Treatment of Iron Residues in the Electrolytic Zinc Process" by J. Rastas, S. Fugleberg, T.-L. Huggare; The Metallurgical Society 102nd AIME Annual Meeting in Chicago, Illinois.

When the solution contains alkali- or $NH_4^+$-ions, the equilibrium is being changed over to a direction favourable to mixed jarosite ($A_xH_3O_{1-x}[Fe_3(SO_4)_2(OH)_6]$), as explained in the last-mentioned article. In the mixed jarosite formula, and in the other formulas that follow, the value of "$x$" is in the range from 0 to 1. Thus if $x$ were equal to 1 in the formula just stated there would be no hydronium jarosite present, whereas if $x$ were equal to 0 there would be no alkali metal or ammonium present and the formula would describe pure hydronium jarosite. Intermediate values of $x$ between 0 and 1 represent the relative presence of hydronium and sodium, potassium or ammonium in mixed jarosite, as shown in the referenced AIME paper by Rastas, Fugleberg and Huggare. Parts of the stability areas of the more common system $A_2O$-$Fe_2O_3$-$SO_3$-$H_2O$ (A = $NH_4$, Na or K) have been presented in the literature, but we have no knowledge of detailed or graphical stability drawings.

Figure 2:
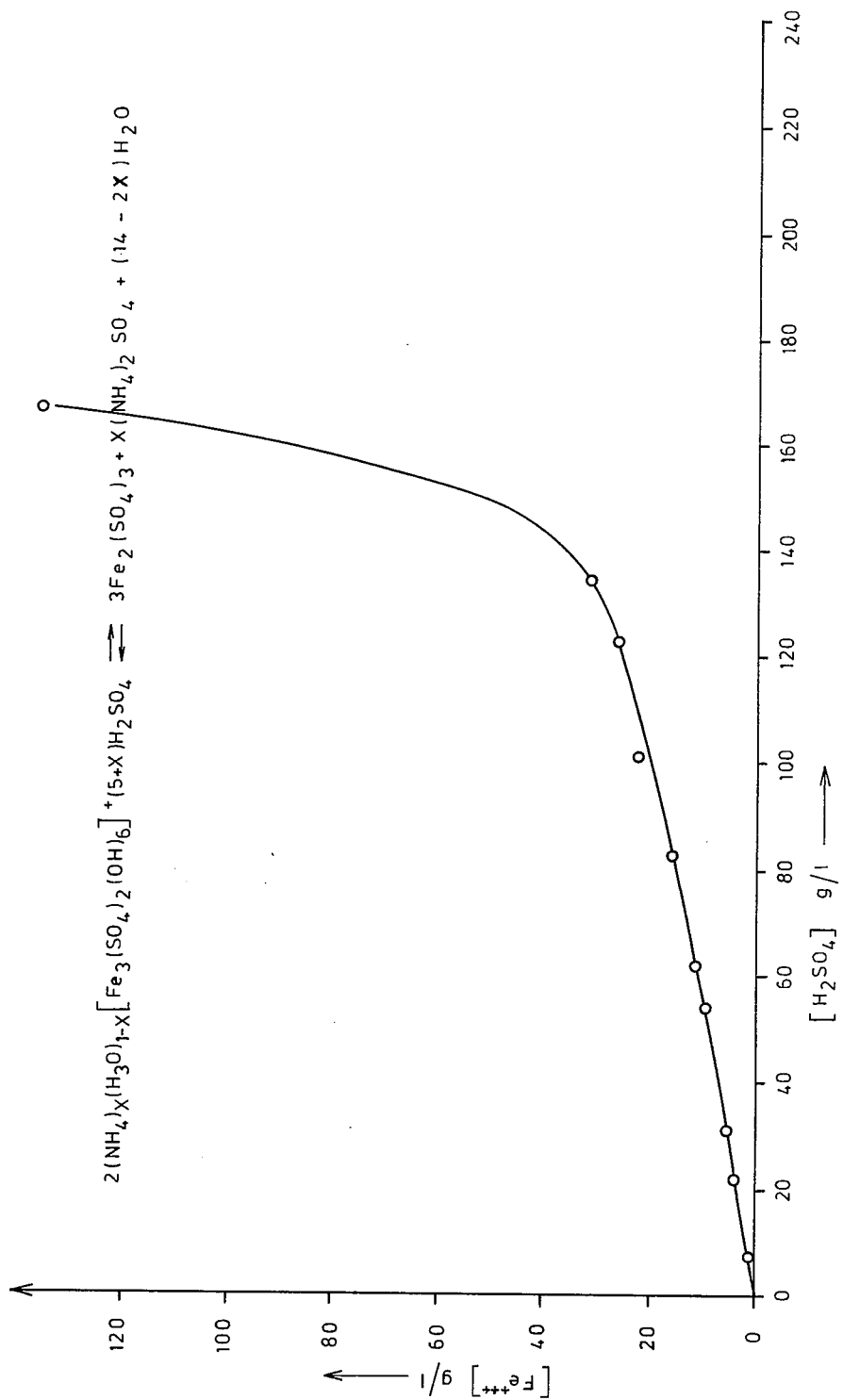
FIG. 2 shows as an example the solubility of an ammonium jarosite as a function of $H_2SO_4$-concentration at a temperature of 95°C.

In order to clarify our method, we have presented in FIG. 2 the solubility curve of a mixed jarosite in system $H_2SO_4$-$Fe_2(SO_4)_3$ - $(NH_4)_2SO_4$ - $H_2O$ $(NH_4)_x(H_3O)_{1-x}$-$[Fe_3(SO_4)_2(OH)_6](s)$. The drawing has been obtained by leaching pure — precipitated under process conditions — $NH_4$-$H_3O$-jarosite in sulphuric acid solution, and the system has been allowed to reach equilibrium for a sufficiently long time. If the point corresponding to the solution composition is above the curve (FIG. 2), it means that the trivalent iron in the solution is precipitated as mixed jarosite and the precipitation velocity depends e.g. on how much the $Fe^{3+}$-concentration is above the corresponding equilibrium value in the curve.

It is seen from FIG. 2 and from what has been said above about leaching of ferrites that when the point corresponding to the composition of the solution phase is above the equilibrium curve (stability area of the solid material), it is possible simultaneously to leach ferrites and to precipitate iron under atmospheric conditions. This invention, the principal characteristics of which are based on the principle that the valuable metals contained in the ferrite-bearing solid material are brought in one stage to enter the solution phase as sulphates and the iron contained in the ferrites to solid basic salt. The following reaction takes place in this stage:

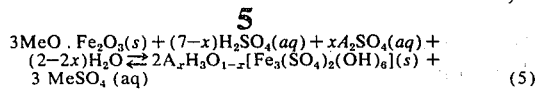

(5)

(Me = Zn, Cu, Cd; A = Na, K, $NH_4$)

As seen from the foregoing equation (5) to precipitate pure hydronium jarosite with $x=0$, seven mols of sulfuric acid are required for every three mols of ferrite. To produce sodium, potassium or ammonium jarosite without any hydronium jarosite, with $x=1$, six mols of sulfuric acid are needed for every three mols of the ferrites. As is evident from equation (5), the value of $x$ cannot exceed 1, which would give the term in $H_2O$ a negative coefficient, nor can $x$ be negative.

In principle, this reaction can be thought to be formed from the reaction describing the leaching of ferrites

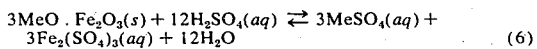

(6)

and from the reaction describing the precipitation of iron

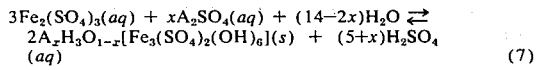

(7)

but it is noted, however, that in the conversion reaction (5) we can get on with a smaller amount of sulphuric acid — and thus with a smaller solution flow — than in case reactions (6) and (7) are carried out separately.

If such an amount of ferric sulphate solution is fed to the conversion stage that the sulphuric acid amount liberated in reaction (7) is equivalent with the sulphuric acid amount needed in reaction (6), the following sum reaction (8) is obtained = (5+x/4) . (6) + (7)

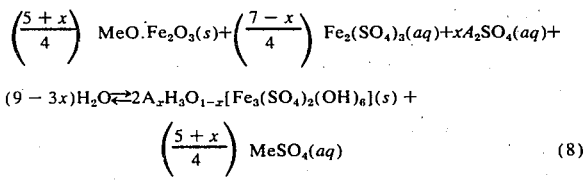

(8)

(Me = Zn, Cu, Cd; A = Na, K, $NH_4$

In principle, it is possible to leach ferrites and to precipitate iron simultaneously in all points, which are above the equilibrium curve (FIG. 2). Since, however, the leaching rate of ferrites is decreased while the acid content of the solution is decreasing and, on the other hand, the iron remaining unprecipitated in the solution is increased while the acid content of the solution is increasing, the conditions in practical cases have to be chosen so that the operation takes place within the optimal acid concentration range, and then the maximum recovery of zinc and other valuable metals can be achieved by minimizing the expenses caused by circulating iron and by treatment time.

In the electrolytic zinc production process it is possible to make use of the method described above for example in the following way:

After neutral leaching, the ferrite-bearing solid material is separated (thickening, filtering) and led to the conversion stage. The sulphuric acid needed — according to reaction (5)— is added in the form of spent electrolyte and/or in the form of strong sulphuric acid (the amount of strong sulphuric acid is determined by the sulphate balance of the process (Jarosite Process boosts Zinc, World Mining, Sept. (1972) 34–38). The best conditions are achieved when the temperature is close to the boiling point of the solution and the alkali and/or ammonium-content is as high as possible.

By adjusting the acid concentration the dissolution degree of ferrites is optimized and, on the other hand, also the content of ferric iron remaining in the solution.

This treatment of ferrites can be performed either as continuous or batch process. When the wanted extraction of valuable metals has been achieved, the solution and the solid material are separated; the solution is returned to the neutral stage and the solid material is treated in the normal way (washed with water and removed from the process). A solution amount as small as possible is obtained for the conversion stage, if the ferritic residue is free of zinc oxide consuming acid.

Figure 3:
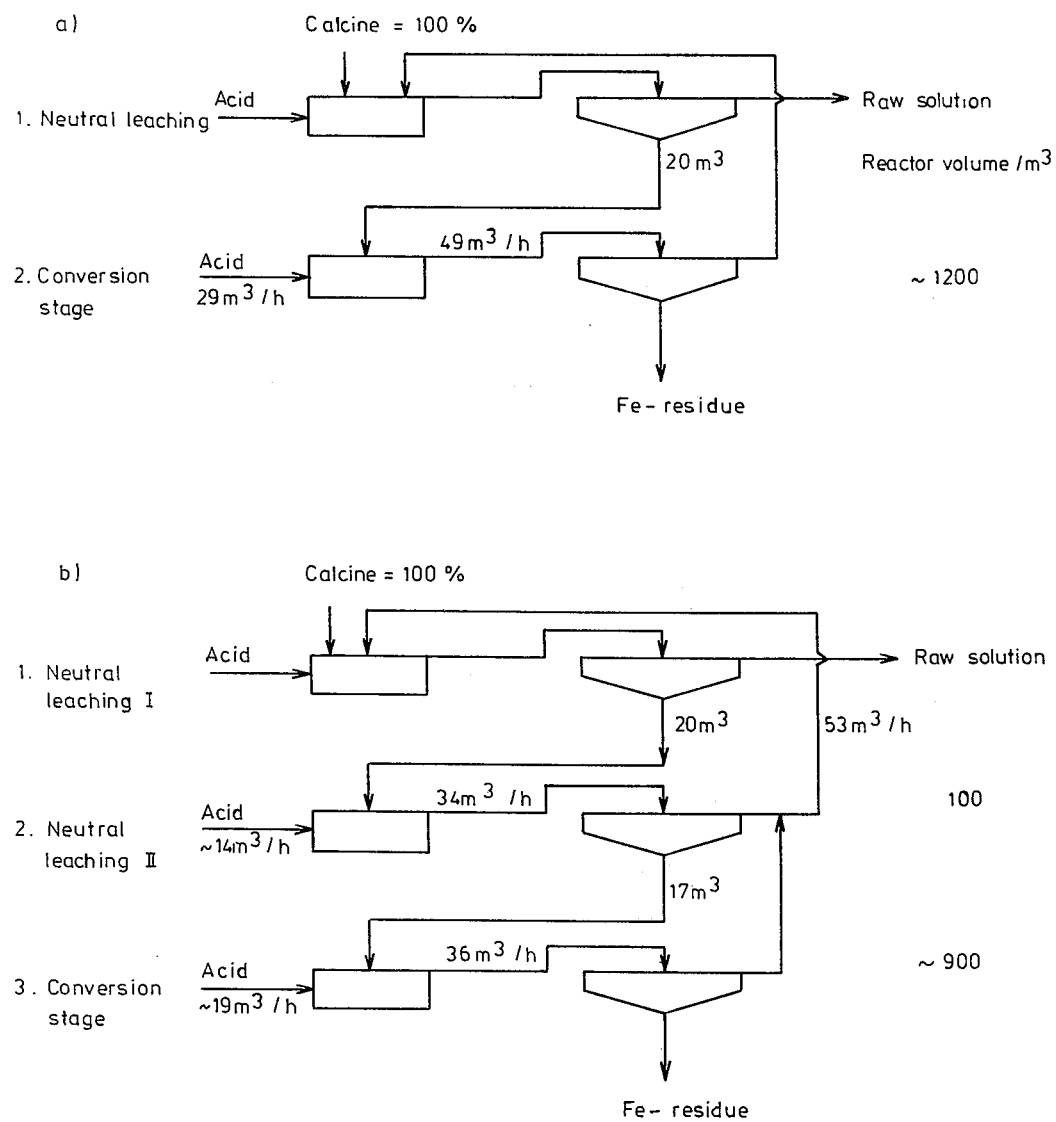
FIGS. 3 and 4 show flowsheets of favourable ways of carrying out the invention.

This can be achieved by two-stage countercurrent neutral leaching of calcine. A typical flowsheet has been presented in FIG. 3b. In this coupling arrangement, the raw solution of the zinc process is obtained from the first neutral stage, when the pH normally is so high that ferric iron is completely precipitated (pH 3.5 – 5.0). Under these conditions, some ZnO is always left undissolved (in case calcine is used also in the final neutralization). This excess oxide can be leached in the second "neutral" stage, where pH is kept within such range that the oxides dissolve, but the ferrites are left practically undissolved.

The second neutral stage can be omitted, if some additional reactor volume has been provided for in the conversion stage and if circulation of a little bigger iron amount is allowed in the process. This coupling arrangement is shown in FIG. 3a.

In the following, the method based on this invention — the conversion process — has been compared with the jarosite process described earlier. The arrangement scheme of the latter is presented in FIG. 1. The approximate calculated solution flows have been presented in FIGS. 1 and 3, obtained in the jarosite and conversion processes, when 100,000 t Zn/year, 52 % Zn and 10 % Fe in the concentrate make the calculation basis. The neutral stage (pH 4.5) is the same in all the three cases (85 % of Zn-oxide in the calcine is dissolved) and the addition of strong acid is the same. When calculating the reactor volume it has been assumed that the same recoveries of valuable metals are obtained in both processes. The calculations are based on the tests carried out by the patent applicants. It is seen from the comparison that in the conversion process it is possible to get along with a smaller reactor volume than in the jarosite process even if only one neutral stage is used (3a).

The control of the conversion process is clearly simpler than that of the process presented in FIG. 1, because (1) there are fewer stages, (2) calcine feed takes place into one point and (3)control is performed with solutions. In addition, the conversion stage is self-controlling to a great extent and requires only relatively "rough" control.

Figure 4:
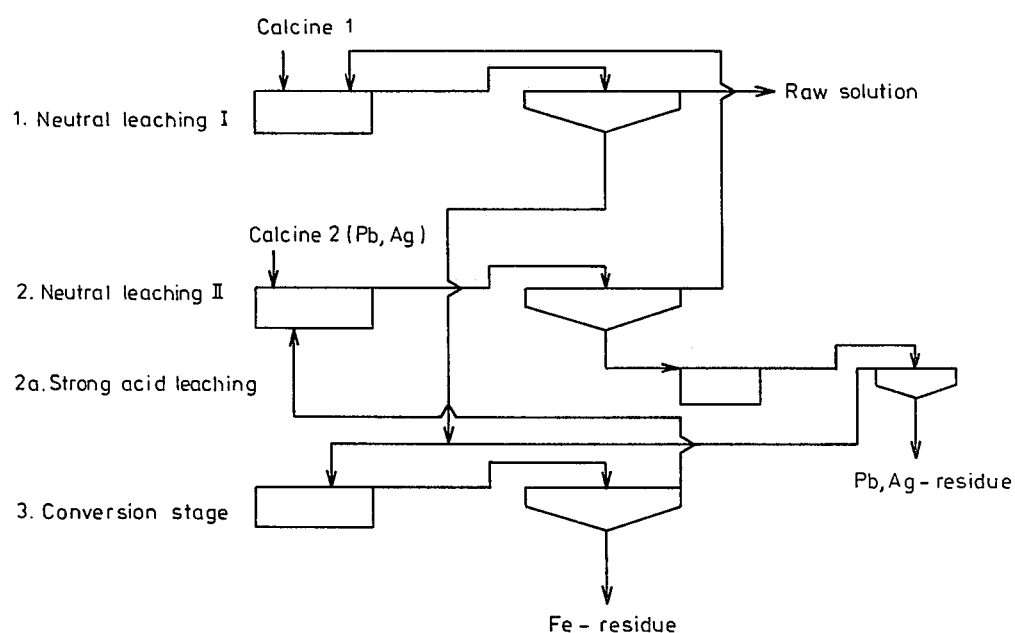

In the jarosite process, it is in principle possible to separate the so-called strong acid leach residue containing the above-mentioned metals are recovered. In practice this occurs very seldom — generally owing to the low Ag-contents of the concentrate — and the SAL-residue is removed from the process together with the iron precipitate. The same takes place also in the conversion process, if it is run in the way presented in FIG. 4. In case it is of advantage — due to the high Pb or Ag-content of the concentrate — to separate the so-called strong acid leach or SAL-residue, this can be done also in the conversion process, and then, by making use of reaction (8), the SAL-stage can be connected to the process e.g. in the way presented in FIG. 4. It is seen from reaction (8) that above 50 % of the iron coming into the process can come through this SAL-stage without having any effect on the conversion stage.

EXAMPLE 1

The conversion stage was carried out as batch process. The analysis of the zinc ferrite bearing solid material was:

| Zn | Fe | $NH_4$ | Cu | Cd | Pb | |
|---|---|---|---|---|---|---|
| 20.8 | 38.0 | 0.26 | 0.47 | 0.19 | 3.5 | % |

1 kg of the above-mentioned solid material was fed to the conversion stage, to which also 6.6 l of spent electrolyte was added. In the conversion stage the temperature was about 95°C, and the $H_2SO_4$-content was adjusted by sulphuric acid additions to between 22 – 25 g/l. After 24 hours, solid material and solution were separated from each other. The amount of washed and dried solid material was 1100 g and the analysis:

| Zn | Fe | $NH_4$ | Cu | Cd | Pb | |
|---|---|---|---|---|---|---|
| 3.6 | 30.5 | 2.3 | 0.08 | 0.02 | 3.2 | % |

The $H_2SO_4$—, Fe— and $NH_4$-contents of the solution were 22.0 g/l, 5.4 g/l and about 5 g/l, respectively.

Zinc recovery to the solution in the conversion stage was 81 % and iron recovery to the precipitate 88.5 %.

The zinc and iron contents in the calcine being 60.3 % and 12.4 % respectively, this means an overall zinc recovery of 97.9 % from the calcine to the solution.

EXAMPLE 2

The test was carried out in a way corresponding to that in example 1. The $H_2SO_4$-content in the conversion stage was adjusted, however, to between 28 – 33 g/l. The amount of washed and dried solid material was now 945 g and the analysis:

| Zn | Fe | $NH_4$ | Cu | Cd | Pb | |
|---|---|---|---|---|---|---|
| 2.9 | 31.0 | 2.2 | 0.06 | 0.01 | 3.7 | % |

The $H_2SO_4$—, Fe— and $NH_4$-contents of the solution were 33.0 g/l, 11.4 g/l and about 5 g/l, respectively.

Zinc recovery to the solution was 87 % and iron recovery to the precipitate 77 %. The total recovery of zinc from the calcine to the solution was 98.6 %.

EXAMPLE 3

The conversion stage was carried out as a continuous process. The solid material containing zinc ferrite was the same as in example 1. 150 g/h of such material was fed into a 3-part series reactor. The feed of spent elelctrolyte was 1 l/h. The temperature in the conversion stage was about 95°C, and the sulphuric acid feed was adjusted so that the $H_2SO_4$– content at the end of the stage was 35 – 36 g/l. The total retention time was 24 h.

In each part of the series reactor, the $H_2SO_4$— and $Fe^{3+}$-contents were

| | 1 | 2 | 3 |
|---|---|---|---|
| $H_2SO_4$ g/l | ca. 30 | 32–34 | 35–36 |
| $Fe^{3+}$ g/l | 14 | 15 | 11 |

The Zn-content of washed solid material was at the end of the stage 2.0 % and the Fe-content 29.9 %.

Zinc recovery to the solution was in the conversion stage 91.0 % and the total recovery from the calcine to the solution 99.0 %. Iron recovery to the precipitate was in the conversion stage 78 %.

EXAMPLE 4

The test was carried out in a way corresponding to that in example 1. The $H_2SO_4$ —content in the conversion stage was adjusted, however, to between 65 – 70 g/l and the separation of solid material and solution was performed after 8 hours. The amount of the washed and dried solid material was now 980 g and the analysis:

| Zn | Fe | K | Cu | Cd | Pb | |
|---|---|---|---|---|---|---|
| 1.3 | 30.8 | 6.5 | 0.05 | 0.01 | 3.6 | % |

The $H_2SO_4$—, Fe— and K-contents of the solution were at the end of the test 69 g/l, 10.8 g/l and 2.4 g/l, respectively.

Zinc recovery to the solution was 93.9 % and iron recovery to the precipitate 81 %. The total recovery of zinc from the calcine to the solution was 99.3 %.

What is claimed is:

1. A hydrometallurgical process for the treatment of a raw material containing an oxide and a ferrite of at least one of the non-ferrous metals zinc, copper and cadmium, comprising neutral leaching said raw material with a sulfuric acid bearing solution to dissolve said oxide while leaving said ferrite substantially undissolved, separating a residue containing said ferrite, admixing additional sulfuric acid bearing solution and in the presence of ions selected from the group consisting of sodium potassium and ammonium ions with said residue at atmospheric pressure and at a temperature of from about 80° to 105°C, said additional sulfuric acid bearing solution containing sufficient sulfuric acid to satisfy the reaction:

$$3\ MeO.Fe_2O_3 + (7-x)H_2SO_4 + x\ A_2SO_4 + (2-2x)H_2O \rightarrow 2A_x(H_3O)_{1-x}[Fe_3(SO_4)_2(OH)_6] + 3\ MeSO_4$$

where Me is zinc, copper, or cadmium and A is sodium, potassium or ammonium, and $x$ has a positive value not exceeding 1, and thereby causing said non-ferrous metals present to dissolve as sulfates while simultaneously precipitating iron as jarosite, and separating and recycling a solution containing said dissolved non-ferrous metals to said neutral leaching.

2. The process of claim 1 wherein the residue containing said ferrite is physically separated from the solution before the addition of the sulfuric acid bearing solution.

3. The process of claim 1 wherein substantially all of the iron is precipitated in a single stage by such jarosite formation.

4. The process of claim 1 wherein said additional sulfuric acid bearing solution is added in an amount equivalent to the amount of ferrite residue plus a slight excess to control the reaction time.

5. The process of claim 1 including washing said jarosite with wash water and recycling said wash water together with the solution containing said dissolved non-ferrous metals to said neutral leaching.

6. The process of claim 1 wherein the concentration of sulfuric acid is from 15 to 80 g/l.

7. A hydrometallurgical process for the treatment of a raw material containing an oxide and a ferrite of at least one of the non-ferrous metals zinc, copper and cadmium, comprising neutral leaching said raw material with a sulfuric acid bearing solution to dissolve said oxide while leaving said ferrite substantially undissolved, separating a residue containing said ferrite, admixing ferric sulfate bearing solution and in the presence of ions selected from the group consisting of sodium potassium and ammonium ions with said residue at atmospheric pressure and at a temperature of from about 80° to 105°C, said ferric sulfate bearing solution containing sufficient ferric sulfate to satisfy the reaction:

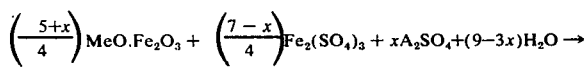

-continued

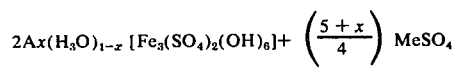

where Me is zinc, copper or cadmium, and A is sodium, potassium or ammonium, and $x$ has a positive value not exceeding 1, and thereby causing said non-ferrous metals present to dissolve as sulfates while simultaneously precipitating iron as jarosite, and separating and recycling a solution containing said dissolved non-ferrous metals to said neutral leaching.

8. The process of claim 7 wherein the residue containing said ferrite is physically separated from the solution before the addition of the ferric sulfate bearing solution.

9. The process of claim 7 wherein substantially all of the iron is precipitated in a single stage by such jarosite formation.

10. The process of claim 7 wherein said ferric sulfate bearing solution is added in an amount equivalent to the amount of ferrite residue plus a slight excess to control the reaction time.

11. The process of claim 7 including washing said jarosite with wash water and recycling said wash water together with the solution containing said dissolved non-ferrous metals to said neutral leaching.

* * * * *